(12) United States Patent
McCaffrey

(10) Patent No.: US 11,492,915 B2
(45) Date of Patent: Nov. 8, 2022

(54) TURBINE WITH REDUCED BURST MARGIN

(71) Applicant: Raytheon Technologies Corporation, Farmington, CT (US)

(72) Inventor: Michael G. McCaffrey, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/124,981

(22) Filed: Dec. 17, 2020

(65) Prior Publication Data
US 2022/0195876 A1    Jun. 23, 2022

(51) Int. Cl.
*F01D 5/28* (2006.01)
*F01D 5/30* (2006.01)
*F01D 21/04* (2006.01)

(52) U.S. Cl.
CPC .......... *F01D 5/282* (2013.01); *F01D 5/284* (2013.01); *F01D 5/3084* (2013.01); *F01D 21/045* (2013.01); *F05D 2230/50* (2013.01); *F05D 2300/6033* (2013.01); *F05D 2300/6034* (2013.01)

(58) Field of Classification Search
CPC ......... F01D 5/284; F01D 5/282; F01D 21/045
See application file for complete search history.

(56) References Cited

U.S. PATENT DOCUMENTS

| | | |
|---|---|---|
| 8,100,662 B2 * | 1/2012 | Schreiber .............. F01D 5/3092 416/248 |
| 8,251,640 B2 | 8/2012 | Beckford et al. |
| 9,850,174 B2 * | 12/2017 | Corman ................ C04B 35/565 |
| 9,914,282 B2 | 3/2018 | Roach et al. |
| 10,174,624 B1 * | 1/2019 | McCaffrey .............. B32B 18/00 |
| 10,746,045 B2 | 8/2020 | Kray et al. |
| 2012/0020789 A1 | 1/2012 | Dijoud |
| 2017/0370376 A1 | 12/2017 | Kray et al. |
| 2020/0116043 A1 | 4/2020 | Jain et al. |
| 2020/0141268 A1 | 5/2020 | Kray et al. |

OTHER PUBLICATIONS

"Derivation, parameterization and validation of a creep deformation/rupture material constitutive model for SiC/SiC ceramic-matrix composites (CMCs)", AIMS Materials Science, [Online] vol. 3, No. 2, May 18, 2016, Grujicic Mica et al.
European Search Report dated May 10, 2022 in EP Application No. 21215534.5.

* cited by examiner

*Primary Examiner* — Michael L Sehn
(74) *Attorney, Agent, or Firm* — Bachman & LaPointe, P.C.

(57) ABSTRACT

A ceramic matrix composite gas turbine blade comprising a root portion coupled to a disk, said root portion having a neck; a platform region is disposed along an upper portion of the neck; an airfoil is located opposite the neck relative to the platform and extends outwardly from the platform; and a limiting section fuse formed in the blade proximate the neck.

19 Claims, 3 Drawing Sheets

TURBINE WITH REDUCED BURST MARGIN

BACKGROUND

The present disclosure is directed to a ceramic matrix composite (CMC) gas turbine engine blade configured with a limiting section, in particular use of unidirectional material in the laminate design in a direction configured to overload and break at a predetermined load.

A shaft fracture in a gas turbine engine leads to a turbine rotor overspeed because the gas load is still creating torque, which is no longer being absorbed by the compressor (fan, low pressure compressor, (LPC), intermediate pressure compressor (IPC) or high pressure compressor (HPC)) or no longer absorbed by the engine load (turboprop, turboshaft, power turbine). The sudden unloading causes the turbine rotor to rapidly accelerate to very high speed. Depending upon how quickly the engine controls respond to the overspeed event, and/or the compressor stalls, or other means to reduce torque, the magnitude of overspeed can be very large. In certain circumstances, the overspeed can be greater than 120% of the redline speed.

Gas turbine engine regulations specify the turbine disk should not fracture (burst) during an overspeed. However, blade shedding is typically acceptable, because the loss of the airfoils is typically containable within the engine.

Turbine blades are designed for overspeed. However, the need for long-term creep/stress rupture requirements results in the stress level at the overspeed condition to be below the short-term strength capability, hence the blades do not fracture, and they continue to accelerate the turbine rotor. The high overspeed speed (rpm) can drive the sizing and weight of the disk. Thus, the disk is often sized to include extra weight in order to withstand the overspeed event.

What is desired is a way to shed the blades (de-cobb the rotor) in a predictable manner, and at a speed range, which is above the required transient redline, but below the speed that would otherwise occur. This reduction in maximum rotor overspeed would result in a much lighter disk as the load is a function of the square of the rotor speed, i.e. Load is proportional to the product of(rpm*rpm).

SUMMARY

In accordance with the present disclosure, there is provided a ceramic matrix composite gas turbine blade comprising a root portion configured to be coupled to a disk, the root portion having a neck; a platform region is disposed along an upper portion of the neck; an airfoil is located opposite the neck relative to the platform and extends outwardly from the platform; and a limiting section fuse formed in the blade proximate the neck.

A further embodiment of any of the foregoing embodiments may additionally and/or alternatively include the limiting section fuse comprises ceramic matrix composite material having interior ply layers aligned in a ninety-degree direction with respect to outer ply layers aligned in a zero-degree direction.

A further embodiment of any of the foregoing embodiments may additionally and/or alternatively include the zero-degree direction comprises a range from negative 5 degrees to 5 degrees in a radial direction relative to the blade orientation in the gas turbine engine.

A further embodiment of any of the foregoing embodiments may additionally and/or alternatively include the limiting section fuse is configured as unidirectional layup located in an area of the composite blade that is designed to fracture at a lower force than the remaining portion of the composite blade.

A further embodiment of any of the foregoing embodiments may additionally and/or alternatively include the limiting section fuse is configured to fracture at a predetermined speed of the disk.

A further embodiment of any of the foregoing embodiments may additionally and/or alternatively include the limiting section fuse is configured with a load to fracture with no proportional limit.

A further embodiment of any of the foregoing embodiments may additionally and/or alternatively include the limiting section fuse comprises a fiber fraction of from 5% to 45%.

In accordance with the present disclosure, there is provided a gas turbine engine comprising a disk, a ceramic matrix composite blade coupled to the disk, the blades including a root portion coupled to the disk, the root portion having a neck; a platform between an airfoil portion and the root portion; and a limiting section fuse proximate the neck; wherein the limiting section fuse comprises composite material having interior ply layers aligned in a ninety-degree direction with respect to outer ply layers aligned in a zero-degree direction.

A further embodiment of any of the foregoing embodiments may additionally and/or alternatively include the zero-degree direction comprises a range from negative 5 degrees to 5 degrees in a radial direction relative to the blade orientation in the gas turbine engine.

A further embodiment of any of the foregoing embodiments may additionally and/or alternatively include the limiting section fuse is configured as a unidirectional layup located in an area of the composite blade that is designed to fracture at a lower force than the remaining portion of the composite blade.

A further embodiment of any of the foregoing embodiments may additionally and/or alternatively include the limiting section fuse is configured to fracture at a load corresponding to a disk speed of 0 percent to 2 percent above the required five minute overspeed design point per aviation regulations with less than a two percent margin.

A further embodiment of any of the foregoing embodiments may additionally and/or alternatively include the disk is configured to withstand the required five minute overspeed design point per aviation regulations with less than two percent margin.

A further embodiment of any of the foregoing embodiments may additionally and/or alternatively include the limiting section fuse comprises a fiber fraction of from 35% to 45%.

A further embodiment of any of the foregoing embodiments may additionally and/or alternatively include the engine includes at least two composite blades coupled to the disk and wherein the limiting section fuses in the composite blades are configured to fracture at about the same disk speed.

A further embodiment of any of the foregoing embodiments may additionally and/or alternatively include the limiting section fuse is configured to fracture at a load corresponding to a disk speed when the engine is fully assembled that is more than 120% but less than about 122% of the maximum rated speed for the disk.

A further embodiment of any of the foregoing embodiments may additionally and/or alternatively include the disk being configured such that the disk can withstand a load corresponding to a disk speed when the engine is fully assembled that is less than about 122% of the maximum rated speed for the disk but cannot withstand a load corresponding to a disk speed when the engine is fully assembled that is greater than about 122% of the maximum rated speed for the disk.

In accordance with the present disclosure, there is provided a process for reducing a burst margin in a gas turbine engine disk comprising forming a gas turbine blade comprising a root portion coupled to the disk, the root portion having a neck; the blade including a platform between an airfoil portion and the root portion; and forming a limiting section fuse proximate the neck; wherein the limiting section fuse comprises composite material at interior ply layers aligned in a ninety-degree direction with respect to outer ply layers aligned in a zero-degree direction, wherein the zero-degree direction comprises a range from 0 degrees to 5 degrees in a radial direction relative to the blade orientation in the gas turbine engine and the ninety-degree direction is orthogonal to the zero-degree direction.

A further embodiment of any of the foregoing embodiments may additionally and/or alternatively include the process further comprising configuring the limiting section fuse is as a unidirectional layup located in an area of the composite blade that is designed to fracture at a lower force than the remaining portion of the composite blade proximate the limiting section fuse.

A further embodiment of any of the foregoing embodiments may additionally and/or alternatively include the process further comprising configuring the limiting section fuse to fracture at a load responsive to a disk speed above a redline speed and below a predetermined maximum speed.

A further embodiment of any of the foregoing embodiments may additionally and/or alternatively include the limiting section fuse is configured with a load to fracture with no proportional limit.

A further embodiment of any of the foregoing embodiments may additionally and/or alternatively include the limiting section fuse comprises a fiber fraction of from 5% to 45%.

Other details of the CMC gas turbine engine blade are set forth in the following detailed description and the accompanying drawings wherein like reference numerals depict like elements.

DETAILED DESCRIPTION

Figure 1:
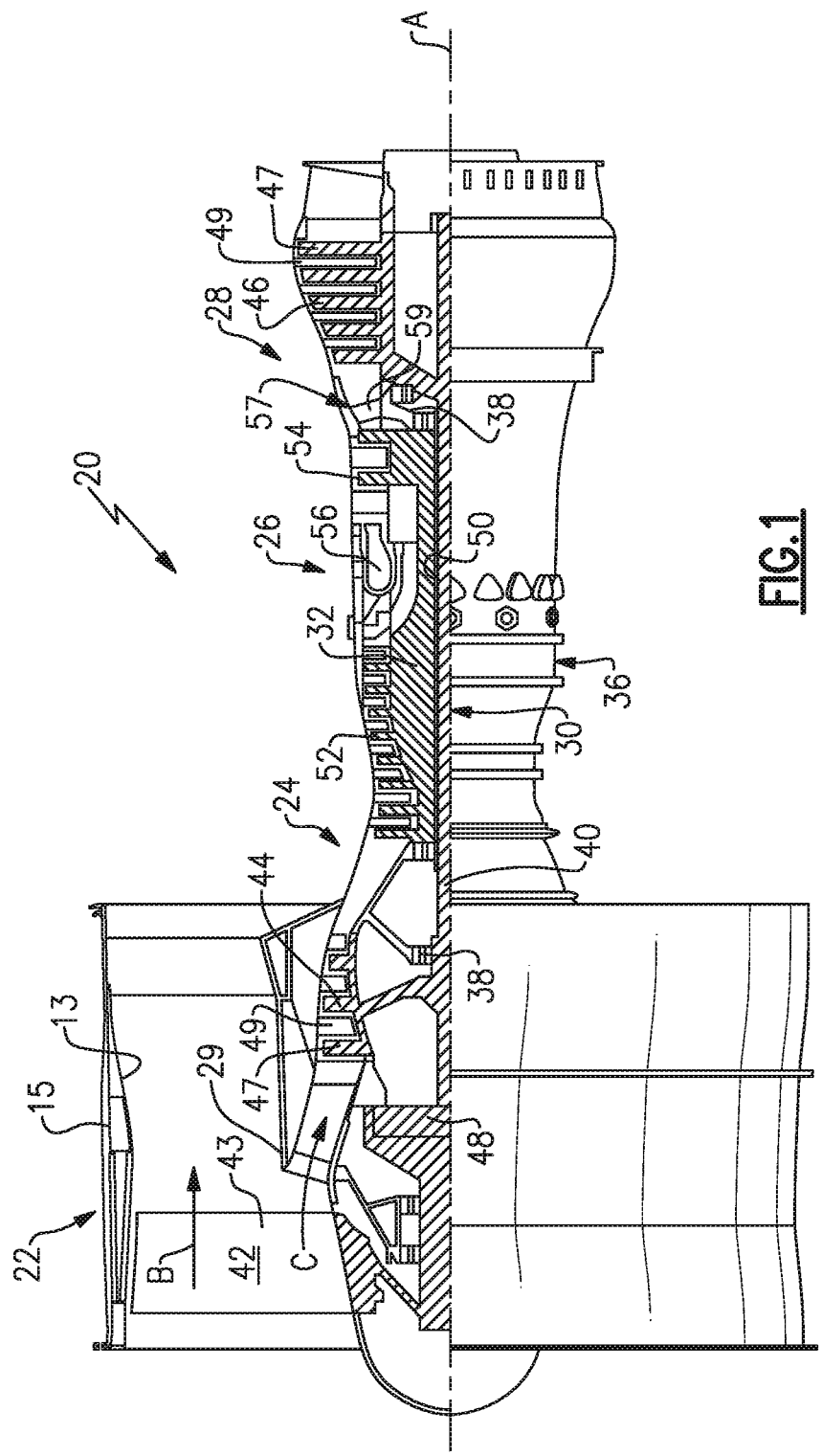
FIG. 1 is a schematic view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area fan nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 feet (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(T_{ram} \degree R)/(518.7 \degree R)]^{0.5}$. The "1 corrected fan tip speed" can be less than or equal to 1150.0 ft/second (350.5 meters/second), and greater than or equal to 1000.0 ft/second (304.8 meters/second).

Figure 2:
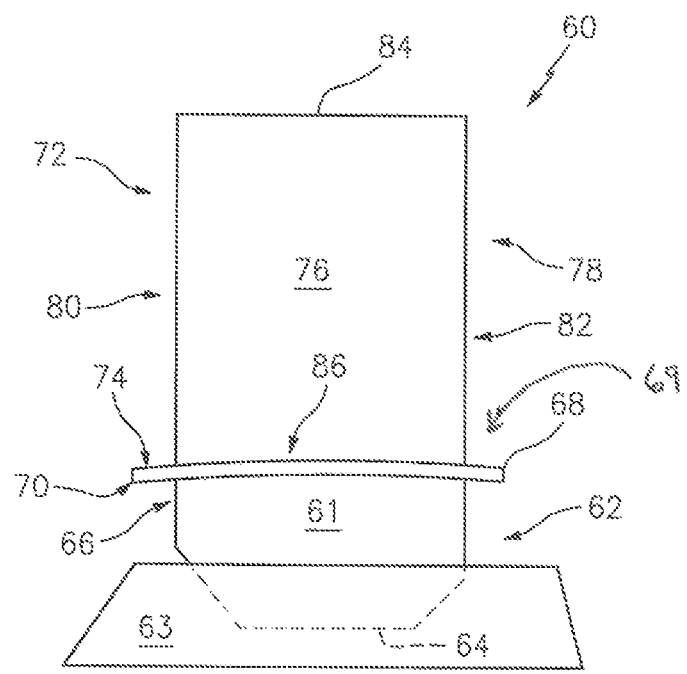
FIG. 2 is a schematic of an exemplary composite blade.

Referring also to FIG. 2, a blade 60 is shown. The blade 60 can be a ceramic matrix composite (CMC) gas turbine engine blade. The blade 60 includes a root portion 61 with a neck 62. The neck 62 is not located in the hot working fluid flow path. The blade 60 is coupled with a turbine disk 63 proximate the root 61. The neck 62 includes a base or first end 64 and a second end 66 at an opposite side relative to the base 64. The blade includes a platform region 69, specifically a platform 68 disposed along an upper portion of the neck 62. The platform region 68 defines the flowpath that separates the hot working fluid from the cooler working fluid proximate the neck 62. The platform 68 can be attached to the blade 60 or does not have to be attached to the blade 60. The platform has a first side 70 facing the second end 66 of the neck 62. The blade 60 further includes an airfoil 72 supported on a second or opposite side 74 of the platform 68 relative to the neck 62 and extending outwardly from the platform 68. The airfoil 72 includes a concave side 76 and an oppositely facing convex side 78. The blade 60 includes an axially leading edge 80, an axially trailing edge 82, a radially outer side 84 and a radially inner side 86.

Figure 3:
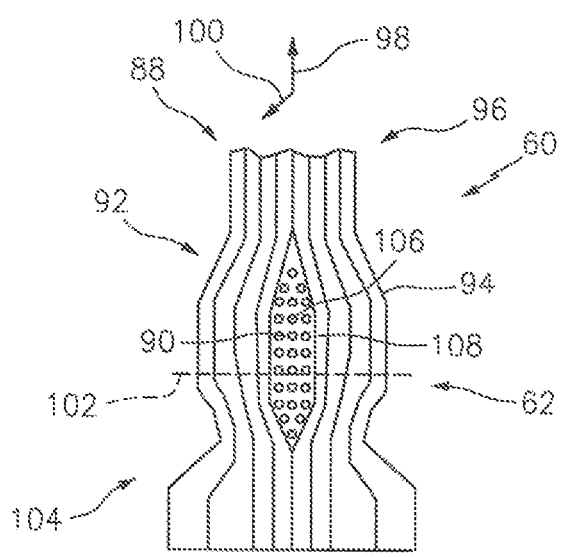
FIG. 3 is a schematic of an exemplary composite blade in partial cross section.

Referring also to FIG. 3, the cross section view of the blade 60 reveals the composite structure 88. The composite structure 88 includes interior ply layers 90 that have varying shapes resulting in an exterior contour 92 of the blade 60 with outer ply layers 94 wrapping around the interior ply layers 90. Although a particular exterior contour 92 is shown in FIG. 3, another exterior contour for a different application would still fall within this disclosure. Although the blade 60 is illustrated, the disclosure applies to all types of components made from a composite material and is not limited to the composite blade 60 illustrated.

The ceramic material composite blade 60 can be made up of the layers 90, 94, of unidirectional, two-dimensional, and three-dimensional weaves. The unidirectional layup 96 is strongest when loaded in the zero-degree direction (0 degree direction), and the weakest when loaded in the ninety-degree direction (90 degree direction). The zero-degree direction 98 is along the radial direction, shown in FIG. 3 that can include a range from −5 degrees to 0 degrees and/or 0 degrees to 5 degrees in the radial direction. The 90 degree direction 100 is along the direction orthogonal and/or substantially orthogonal to the zero-degree direction 98, as shown coming out of the page. The 90 degree direction can range from 85 degrees to 95 degrees in a direction orthogonal/substantially orthogonal to the zero-degree direction.

Figure 4:
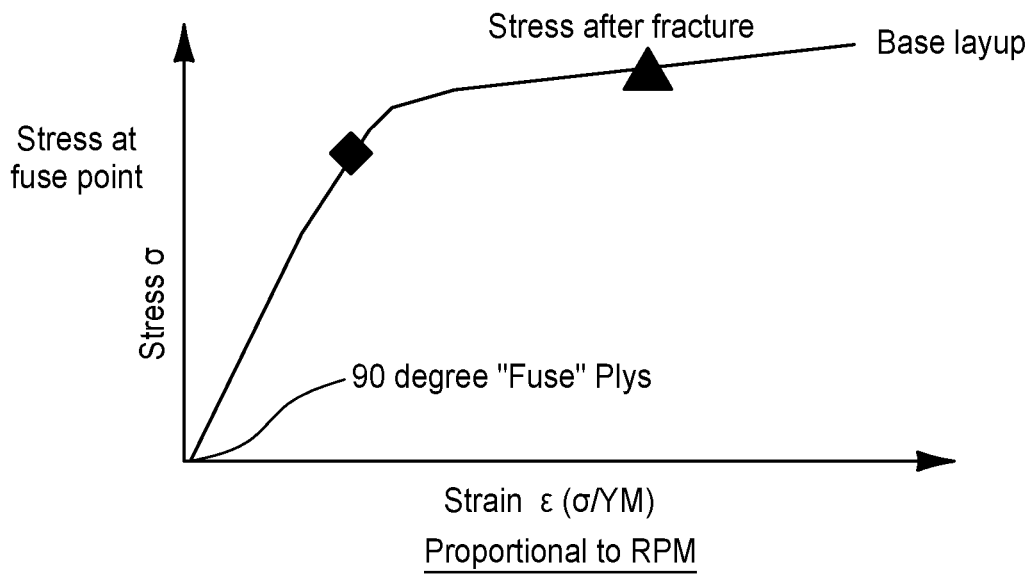
FIG. 4 is a Stress v Strain graphic representation of the performance of the exemplary composite blade with fuse.
Figure 5:
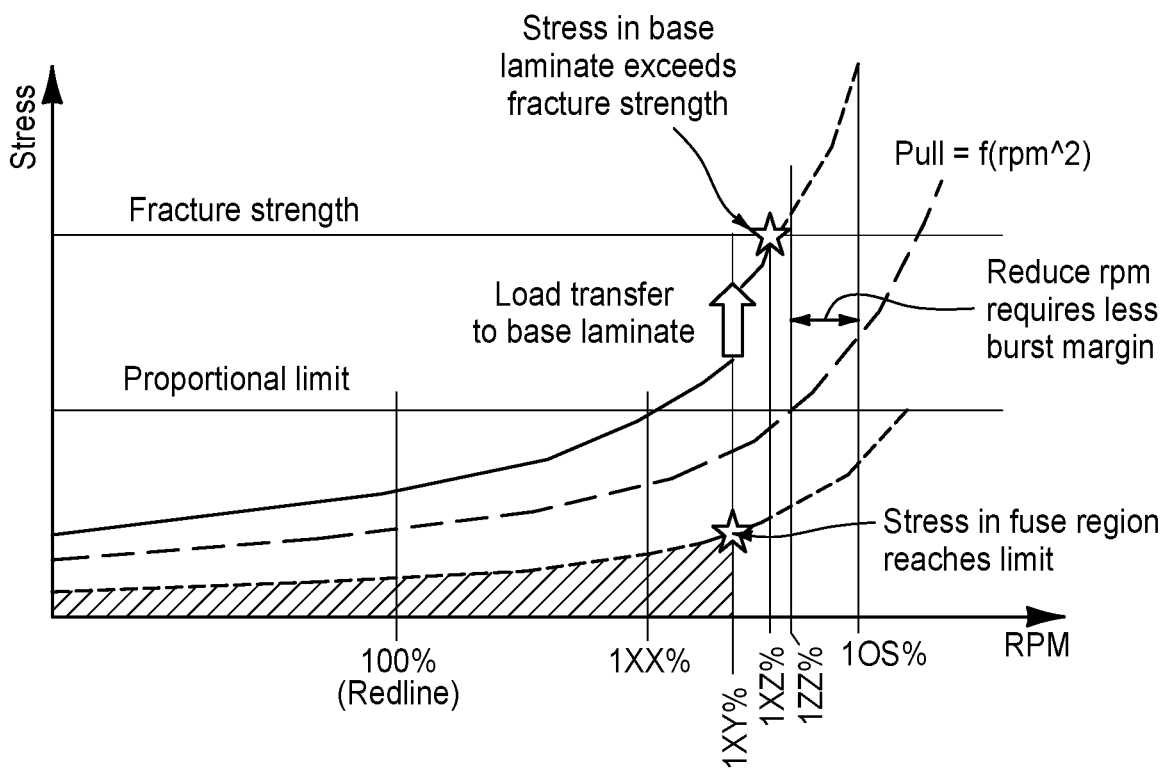
FIG. 5 is a Stress v Speed graphic representation of the performance of the exemplary composite blade with fuse.

Referring also to FIGS. 4 and 5, when loaded in the 0 degree direction 98, the unidirectional material displays a definitive proportional limit and a much higher fracture limit. The proportional limit is the point on a stress-strain curve where the onset of significant matrix cracking occurs. The deformation up to the proportional limit is relatively linear, and load is carried both by the matrix and the ceramic fibers. As stress increases above the proportional limit, the matrix cracking increases. The applied load is transferred from the matrix to the ceramic fibers through the interface coating (IFC). This behavior is revealed in the stress-strain plot, as the slope of the stress-strain curve decreases, representing a decrease in the overall Young's Modulus. In other words, the proportional limit determines the greatest stress where the load is shared between the matrix and the fibers, with minimal matrix cracks. For components made from CMC, repetitive loading and unloading, to stress levels below the proportional limit (PL) will not result in significant permanent deformation of the component.

For loads that cause the CMC to exceed its PL stress, the onset of significant matrix cracking will result in some permanent deformation. This may be in the form of local fracture at stress concentrations (such as a hole or thickness change), at the region of a local curvature change, or local delamination of layers.

CMCs made with 0 degree plies demonstrate the greatest load capability (fracture strength) after the proportional limit. The fracture of the matrix and load transfer through the interface coating results in pure tension in the fibers. Thus the strength of the fibers, and the quantity of fibers in the 0 direction, known as fiber fraction, determine the fracture strength of that ply.

CMC's made with 90 degree plies demonstrate the lowest proportional limit and virtually no additional load capability, such that fracture occurs near or slightly above the PL. Of the three major components of a CMC, matrix, fiber, and interface coating (IFC), the IFC coating is significantly the weakest. When load is applied to a 90 degree ply, the matrix carries the load, with minimal fiber loading through bonding between the fiber and the IFC. Once matrix cracking begins, the bond between the IFC and the fiber is overloaded and subsequently debonds, and removes any load path through the fiber. Since the matrix is the only portion of the CMC that is carrying the load, matrix cracking propagates quickly, leading to rapid fracture. In the case of 90 degree plies, an increase in fiber fraction lowers the PL, as there is less matrix to carry the load. Altering the fiber fraction in the 90 ply will directly change the fracture strength of the CMC.

Fracture is the separation of an object or material into two or more pieces under the action of stress. When the blade 60 is loaded in the 90 degree direction 100, the unidirectional material can display a load to fracture, with no proportional limit. The magnitude of the fracture strength of the material can be much lower than the proportional limit of the 0 direction 98 unidirectional material. The legend for FIG. 5 includes the following: 100%=steady state redline; 1XX %=Max transient redline; 1XY %=load limit in fuse; 1XZ %=load limit blade; 1ZZ %=de-cobb event completed; 10S %=overspeed w/o de-cobb.

The blade 60 can be designed by aligning the layup of the unidirectional laminate material 96 to include a limiting section fuse or merely limiting section 102 proximate the neck 62. The limiting section 102 is shown schematically by a dashed line, however it is understood that the limiting section 102 can cover a larger area within the blade 60 proximate the neck 62. In an exemplary embodiment, the limiting section 102 can be located adjacent and just above the neck 62. The limiting section 102 can be configured by aligning unidirectional material 96 at the interior layers 90 in the 90 degree direction 100 with respect to the 0 degree direction 98. The advantage of the limiting section 102 in the blade 60 is achieved because the total blade load 104 passes through the whole blade 60 laminate with a portion 106 of the total blade load 104 passing through the limiting section 102. Once the limiting section 102 is overloaded, the limiting section 102 cleanly breaks. Upon failure of the limiting section 102, the remaining laminate structure 94 proximate the limiting section 102 takes up the total load.

At a predetermined speed (rpm), the laminate structure 94 fractures. Since all blades 60 attached to the disk 63 can be configured with the limiting section fuse 102, all blades 60 are in a condition to fracture at the predetermined maximum speed. The predetermined maximum speed (rpm) can be set to be at or above the minimum required speed margin, such as defined by the (US) FAA in the Federal Airworthiness Regulations (FAR), Part 33.27. The limiting section fuse 102 is configured to fracture at a load corresponding to a disk speed of 0 percent to 2 percent above the required five minute overspeed design point per aviation regulations with less than a two percent margin. The limiting section fuse 102 can be configured to fracture at a load corresponding to a disk speed when the engine is fully assembled that is more than 120% but less than about 122% of the maximum rated speed for the disk 63. The disk 63 is configured to withstand the required five minute overspeed design point per aviation regulations with less than two percent margin. The disk 63 can be configured such that the disk 63 can withstand a load corresponding to a disk speed when the engine is fully assembled that less than about 122% of the maximum rated speed for the disk 63 but cannot withstand a load corresponding to a disk speed when the engine is fully assembled that is greater than about 122% of the maximum rated speed for the disk 63. Once one blade 60 breaks free from the disk 63, the blade 60 enters the flowpath of the remainder of the blades 60. The sudden impact of the free blade 60 with the other blades 60 overloads the impacted blade 60. There is a cascading blade 60 fracture event that follows the initial blade 60 fracture. Once all the blades 60 de-cobb from the disk 63, the spinning rotor cannot accelerate, due to the absence of the driving torque. The CMC material blades 60 have no significant creep/stress rupture debit, especially proximate the neck 62 region of the blade 60, since the neck 62 is cooler. Thus, the short term and long term strengths are similar. A section with some statistical distribution will result in a fracture at a predictable predetermined speed. The cascading de-cobb event can occur at the first limiting blade in the whole disk 63.

The interior layers 90 include at least one 90 degree direction layer 106 and at least one zero-degree direction layer 108 in proximate relationship with each other. The at least one 90 degree direction layer 106 can be made of the same material as the at least one zero-degree direction layer 108, or differing materials may be used to provide a localized stiffness discontinuity. The limiting section fuse 102 defines an area of the composite blade 60 that is designed to fracture or fail at a lower force than the remaining portion of the composite blade 60.

The limiting section 102 can include a fiber fraction of from 5% to 45%. In an exemplary embodiment, the limiting section 102 can include a fiber fraction of from 35% to 45%.

In an exemplary embodiment, the disk 63 is configured with a reduced design required for an overspeed capability. The term Burst Margin represents the relative rpm capability of the disk relative to the rated redline speed, defined here as 100% rpm, of a particular design. A disk that ruptures at 125% of redline speed is said to have a burst margin of 1.25.

The technical advantage of the exemplary composite blade with the fuse located proximate the neck includes a fuse located adjacent and above the neck of the root section.

The technical advantage of the exemplary composite blade with the fuse located proximate the neck includes limitation on the maximum overspeed of the turbine disk.

The technical advantage of the exemplary composite blade with the fuse located proximate the neck includes a turbine disk with reduced weight.

The technical advantage of the exemplary composite blade with the fuse located proximate the neck includes a turbine disk with a reduced design required for an overspeed capability.

The technical advantage of the exemplary composite blade with the fuse located proximate the neck includes a turbine engine disk with blades that are designed to de-cobb from the disk in a predictable manner, and at a speed range which is above the required transient redline speed but below the speed that would otherwise occur. Under shaft fracture scenarios, the maximum rotor speed possible is due to the aerodynamic gas load acting upon the blades, causing the rotor to accelerate to an rpm at which the blade torque is balanced with the aerodynamic losses caused by the flow thorough the blade row. For some turbines, without another means of limiting the overspeed, such as the fuel control software or mechanical limiter, the overspeed can exceed 150% of redline speed.

There has been provided a composite blade with fuse. While the composite blade with fuse has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A ceramic matrix composite gas turbine blade comprising:
    a root portion configured to be coupled to a disk, said root portion having a neck;
    a platform region disposed along an upper portion of the neck;
    an airfoil located opposite the neck and extending outwardly away from the neck; and
    a limiting section fuse formed in said blade within the neck; wherein said limiting section fuse comprises ceramic matrix composite material having interior ply layers aligned in a ninety-degree direction with respect to outer ply layers aligned in a zero-degree direction; wherein said zero-degree direction comprises a range from negative 5 degrees to 5 degrees in a radial direction relative to the blade orientation in the gas turbine engine.

2. The ceramic matrix composite gas turbine blade according to claim 1, wherein said limiting section fuse formed in said blade is located within the neck and adjacent just above the neck.

3. The ceramic matrix composite gas turbine blade according to claim 1, wherein said limiting section fuse is configured as unidirectional layup located in an area of the composite blade that is designed to fracture at a lower force than the remaining portion of the composite blade.

4. The ceramic matrix composite gas turbine blade according to claim 1, wherein said limiting section fuse is configured to fracture at a predetermined speed of the disk.

5. The ceramic matrix composite gas turbine blade according to claim 4, wherein said limiting section fuse is configured with a load-to-fracture with no proportional limit.

6. The ceramic matrix composite gas turbine blade according to claim 1, wherein said limiting section fuse comprises a fiber fraction of from 5% to 45%.

7. A gas turbine engine comprising:
    a disk;
    a ceramic matrix composite blade coupled to the disk, said blades including:
    a root portion coupled to said disk, said root portion having a neck;
    a platform between an airfoil portion and said root portion; and
    a limiting section fuse within the neck; wherein said limiting section fuse comprises composite matrix material having interior ply layers aligned in a ninety-degree direction with respect to outer ply layers aligned in a zero-degree direction; wherein said zero-degree direction comprises a range from negative 5 degrees to 5 degrees in a radial direction relative to the blade orientation in the gas turbine engine.

8. The gas turbine engine according to claim 7, wherein said limiting section fuse formed in said blade is located within the neck and adjacent just above the neck.

9. The gas turbine engine according to claim 7, wherein said limiting section fuse is configured as a unidirectional layup located in an area of the composite blade that is designed to fracture at a lower force than the remaining portion of the composite blade.

10. The gas turbine engine according to claim 7, wherein said limiting section fuse is configured to fracture at a load corresponding to a disk speed when the engine is fully assembled that is more than 120% but less than about 122% of the maximum rated speed for the disk.

11. The gas turbine engine according to claim 7, wherein said disk is configured such that said disk can withstand a load corresponding to a disk speed when the engine is fully assembled that is less than about 122% of the maximum rated speed for the disk but cannot withstand a load corresponding to a disk speed when the engine is fully assembled that is greater than about 122% of the maximum rated speed for the disk.

12. The gas turbine engine according to claim 7, wherein said limiting section fuse comprises a fiber fraction of from 35% to 45%.

13. The gas turbine engine according to claim 7, wherein the engine includes at least two composite blades coupled to the disk and wherein the limiting section fuses in the composite blades are configured to fracture at about the same disk speed.

14. A process for reducing a burst margin in a gas turbine engine disk comprising:
    forming a gas turbine blade comprising a root portion coupled to said disk, said root portion having a neck; said blade including a platform between an airfoil portion and said root portion; and
    forming a limiting section fuse within the neck; wherein said limiting section fuse comprises composite material at interior ply layers aligned in a ninety-degree direction with respect to outer ply layers aligned in a zero-degree direction, wherein said zero-degree direction comprises a range from 0 degrees to 5 degrees in a radial direction relative to the blade orientation in the gas turbine engine and said ninety-degree direction is orthogonal to said zero-degree direction.

15. The process of claim 14, further comprising:
    configuring said limiting section fuse as a unidirectional layup located in an area of the composite blade that is designed to fracture at a lower force than the remaining portion of the composite blade proximate the limiting section fuse.

16. The process of claim 14, further comprising:
    configuring said limiting section fuse to fracture at a load corresponding to a disk speed of 0 percent to 2 percent above a required five minute overspeed design point per aviation regulations with less than a two percent margin.

17. The process of claim 14,
    wherein said limiting section fuse is configured with a load-to-fracture with no proportional limit.

18. The process of claim 14, wherein said disk is configured to withstand a required five minute overspeed design point per aviation regulations with less than two percent margin.

19. The process of claim 14, wherein said limiting section fuse comprises a fiber fraction of from 5% to 45%.

* * * * *